United States Patent Office

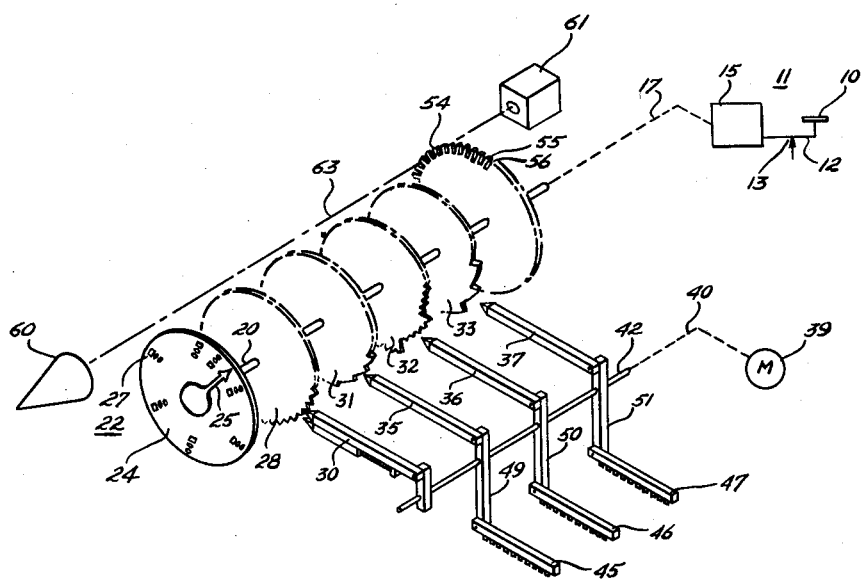

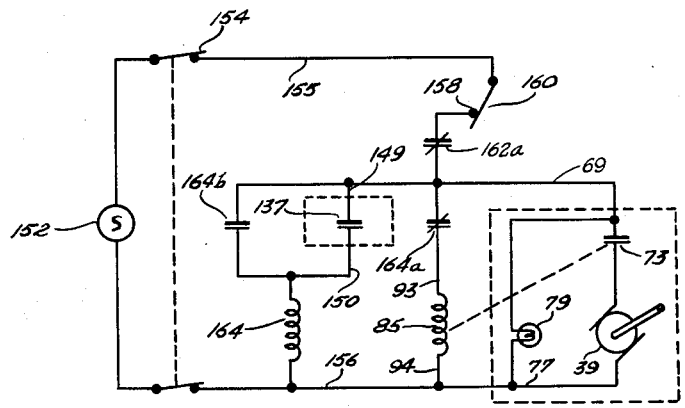
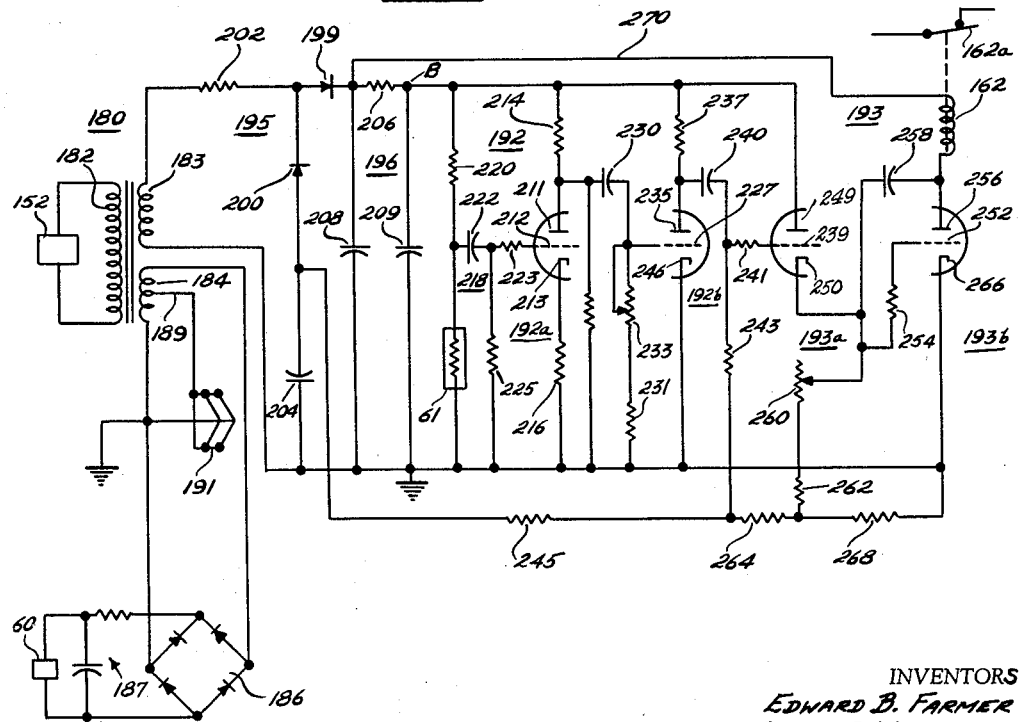

3,040,215
Patented June 19, 1962

3,040,215
SHAFT ROTATION SENSER
Edward B. Farmer, Waban, and David R. Whitehouse, Cambridge, Mass., assignors to Fairbanks, Morse & Co., Chicago, Ill., a corporation of Illinois
Filed Sept. 11, 1959, Ser. No. 839,316
6 Claims. (Cl. 317—130)

The present invention is directed to a driven shaft rotation senser, and more particularly to a shaft rotation senser for detecting the velocity of rotation of a shaft.

While the present invention has application in the broad field of shaft rotation, the environment in which it will be shown, is in the field of weighing.

In automatic weighing applications, it is important that the weight of an object on the scale platform not be recorded until the scale has come to rest or balance. Errors in the recorded weight can appear if the printer or recorder operates during the time of scale unbalance. While visual observation of a pointer and a dial can be used to determine balance of the scale, more rapid weighing can be achieved, if the operation of the printer or recorder is initiated only after balance is achieved.

It is further desirable to have the printer controlling mechanism react rapidly to sense a condition of unbalance. This feature shortens ultimately the time of response of the printer and enables rapid successive weighing of objects. Assembly line techniques of packaging necessitate rapid printer reaction. On the other hand, it is also desirable to have a settable variable time delay during the interval between sensing of scale balance and initiation of the recorder. Without a settable time delay to prevent immediate responsive action of the printer, the printer may operate when the scale is at balance, but at a point whereat the weight indication is erroneous because of overshoot of the indicator. For example, in the conventional scale, the indicator moves across the face of the dial, but because of the inertia of the system, the indicator moves beyond the point of correct weight. Before the indicator comes back to the correct weight, the indicator stops and reverses the direction of travel. At the point where the indicator stops to begin its reversal, the scale system is actually at rest. If the printer reacts too rapidly to sensing of balance, the erroneous overweight will be printed.

In general, the present invention comprises a sensing circuit for detecting the rotation of a shaft. The amount and velocity of angular rotation of a shaft in the scale is a function of the load on the scale platform and the amount of unbalance thereof. Coupled to this shaft for rotation therewith is a wheel or disc whose outer periphery is uniformly slotted. A beam of light is directed through the slots in the periphery of the slotted disc to impinge upon a photocell. The variation of the resistance of the photocell, caused by the interruption of the light beam while the slotted disc rotates, effects operation of the sensing circuit which prevents a scale printer from functioning until the slotted disc ceases rotation. A variable time delay arrangement in the sensing circuit prevents premature operation of the printer when a false balance condition is sensed.

It is an object of the present invention to provide a novel sensing circuit which detects rotation and cessation of rotation of a shaft.

It is another object of the present invention to provide a novel sensing circuit which responds rapidly to sensing rotation of a shaft and has a settable variable time delay after sensing cessation of rotation.

It is yet another object of the present invention to provide a novel sensing circuit which is adjustably settable to respond to one of a predetermined number of speeds of shaft rotation.

With the foregoing, and other objects in view, the invention resides in the following specification and appended claims, embodiments of which are illustrated in the accompanying drawings in which like elements are indicated by like numerals and in which:

FIGURE 1 is a diagrammatic view of the mechanical arrangement of the scale and printer of the invention;

FIGURES 2 and 3 are diagrammatic views of switches used in controlling the operation of the printer of the invention;

FIGURE 4 is an embodiment of a control circuit for the printer of the invention, and FIGURE 5 is a schematic diagram of the sensing circuit of the present invention.

Referring now to the drawings for a detailed explanation of the construction and operation of the present invention and in particular to FIGURE 1, there is therein shown the mechanical arrangement of the scale and printer. Only the general operation of the printer as it may be used in explaining the invention is set forth, as the details of the printer mechanism per se do not constitute a part of the invention. For more detailed views and an explanation of the printer per se, reference may be had to Patent No. 2,070,011, issued to H. A. Hadley et al., on February 9, 1937, and to Patent No. 2,792,208, issued on May 14, 1957, to J. C. Merrill et al., both patents being assigned to the present assignee.

In FIGURE 1, there is shown a scale platform 10 which receives a load applied thereto. A linkage 11 including beam 12 and a knife-edge fulcrum 13 is connected to the remainder of the mechanical apparatus 15 (shown as a box) wherein the movement of the scale platform in response to the weight of the applied load is transferred into rotational movement of a connecting link 17 (shown as a dashed line). The details of mechanical apparatus 15 are not shown inasmuch as any conventional mechanical scale linkage may be used.

Link 17 is connected to shaft 20 to control its angular rotation as a function of the load applied to platform 10. An indicator 22 having a chart member 24 and a pointer 25 is connected to shaft 20, and pointer 25 is rotatable therewith. Pointer 25 cooperates with indicia 27 inscribed on chart 24 to indicate visually the weight of the material on scale platform 10.

An index wheel having a serrate periphery is connected to shaft 20 for rotation therewith. An index wheel locking finger 30 is arranged to engage the teeth on wheel 28 to prevent angular rotation of shaft 20 during the printing function of the scale. The details of the operation of the indexing wheel 28 and its locking finger 30 will be discussed further hereinafter.

For printing a permanent record of the weight, there are provided a plurality of stepped selector discs 31, 32 and 33, each of which corresponds respectively to one of the numerical denominations; units, tens and hundreds. For illustrative purposes, only three selector discs are shown, and thus, the capacity of the scale herein shown is limited to 999 pounds. Additional selector discs may be added if it is desired to have a scale whose capacity exceeds that of the present embodiment. Thus, as shaft 20 rotates in response to the load applied to platform 10, the selector discs 31—33 are positioned. Additionally, selector disc engaging fingers 35—37 are arranged to be urged by a printer motor 39 over a linkage 40 and a common shaft 42 toward respective ones of the selector discs 31—33 and are positioned in accordance with the particular steps of their associated selector discs which they engage.

In like manner locking finger 30 is urged forward to lock the selector disc assembly when printer motor 39 is energized. To ensure accurate positioning of the selector discs, the forward edge of finger 30 is placed closer to the periphery of wheel 28 than the forward edges of fingers 35—37 are placed to their respective selector discs so that finger 30 engages and performs its locking function before any of the fingers 35—37 engages its disc.

Printing members 45—47 are respectively pivotally connected to fingers 35—37 over members 49—51 so that their printing elements are aligned in accordance with the position of their respective fingers. A paper tape (not shown) is urged against the aligned printing elements by a hammer or striker (not shown) to record the digital weight information.

In addition to the indexing wheel 28 and the selector wheels 31—33, there is also a light chopper wheel 54 connected to shaft 20 for rotation therewith. Light chopper wheel 54 is of larger diameter than any of the other wheels and has a series of alternate fingers 55 and slots 56 around its periphery. The fingers 55 and slots 56 are of uniform width and extend outwardly of the peripheries of the other wheels.

A light source 60 and a photocell 61 are mounted so that a beam of light 63 from source 60 is directed toward the photocell 61 and passes through one of the slots 56 when it is in proper alignment with the path of the light beam. Each of fingers 55 of slotted wheel 54 interrupts the path of the light beam when it is interposed between source 60 and photocell 61. The light source 60 and photocell 61 may be of any conventional design, such that the resistance of the photocell varies as the light beam is applied or interrupted in its impingement on the photocell. As wheel 54 rotates, the resistance of photocell 61 changes from one value to another as the alternate fingers and slots interrupt and pass the light beam 63.

The function of photocell 61 and wheel 54 in the sensing of balance will be considered hereafter.

The control of the energization of the printer motor 39 is accomplished by the switches shown in FIGURES 2 and 3, and reference thereto is now made.

In FIGURE 2 the electrical energizing circuit for printer motor 39 is illustrated. This circuit extends from a control circuit 67 (shown in greater detail in FIG. 4) over a conductor 69, the normally open contacts 73 of a microswitch 75, a conductor 76, the windings of motor 39, and a conductor 77 to control circuit 67. A signal lamp 79 is connected in shunt across conductors 69 and 77 to indicate energization of the motor.

The closure and opening of contacts 73 of microswitch 75 are controlled by the cooperation of a solenoid 81 and a switch control mechanism 82.

Solenoid 81 comprises a coil 85 (see FIG. 4) enclosed in a housing 86, and a plunger 88 which is forced outwardly and downwardly of the coil 85 upon energization thereof. Solenoid 81 is mounted on a support 91 which may be the scale housing or other convenient fixed support. Suitable conductors 93 and 94 (see FIG. 4) are connected to coil 85 of solenoid 81 for energization thereof. Solenoid plunger 88 may also be manually actuated through a cap 95 and an internal mechanical linkage (not shown). Solenoid 81 may be any conventional manual and electrical switch suitable for the purpose and switches of this type are available in commerce.

Referring now to the actuation of contacts 73, it may be seen that microswitch 75 has a flexible armature 96 which mates with a fixed contact to form contacts 73. A plunger 99 of insulating material rides against the lower surface of armature 96. Plunger 99 closes contacts 73 when it is in its uppermost position and opens contacts 73 when it is in its lowermost position. Plunger 99 is carried by a flexible spring member 101 which is affixed at one end 102 and is biased downwardly to ride upon the upper surface of a lever 103 at its free end.

Lever 103 is pivotally connected at 105 to an upright bracket member 107 and extends in cantilever fashion with one end having a finger-like downward projection 109. The other end 110 of lever 103 is offset upwardly from the remainder of the lever and extends below and in alignment with plunger 88 of solenoid 81 so that when the plunger 88 is moved outwardly and downwardly, the finger projection 109 is raised upwardly. Upward movement of finger end 109 also causes upward movement of plunger 99 through the action of spring 101 to close contacts 73.

A spring member 111 is connected at one end thereof to lever 103 between pivot 105 and finger 109 and at its other end to bracket 107 near its base to urge finger 109 downwardly at all times. Finger 109 is arranged to ride along the outer surface of a cam 112. Cam 112 comprises a flat circular plate 115 having a transversely projecting flange 116 extending around its periphery. Flange 116 has a slot 118 cut in its surface to receive finger 109 of lever 103 when the slot is beneath the finger. Cam 112 is affixed for rotation to a shaft 120. Shaft 120 is connected to motor 39 over a linkage 122 for rotation therewith.

Also connected to shaft 120 for rotation therewith is a clutch ratchet wheel 123 having teeth around its periphery. A crescent shaped clutch dog 125 is pivotally mounted at its central region on plate 115 within flange 116 and has a tooth engaging finger 126 at one end for engagement with the teeth of ratchet wheel 123. The teeth engaging finger end 126 of clutch dog 125 is urged into engagement with the teeth of clutch ratchet wheel 123 by a spring member 127 connected at the vicinity of finger 126 between the face of clutch dog 125 away from finger 126 and the inner surface of flange 116.

The end of clutch dog 125 opposite the teeth engaging finger 126 has a projection or finger 128 which extends beyond flange 116 through slot 118. Finger 128 is engageable by finger 109 of lever 103 when the latter finger enters slot 118 of flange 116.

While the circuit for the energization of the solenoid will be described in detail hereinafter, the operation of the energization of motor 39 will now be discussed.

In its normal condition, finger 109 of lever 103 rests in slot 118 because of the biasing action of spring 111 and engages finger 128 of clutch dog 125. In this position, finger 109 forces teeth engaging finger 126 out of engagement with the teeth of clutch ratchet wheel 123. In the illustration, the position of finger 109 is shown as it rides along the surface of flange 116 with cam 112 about midway during one cycle of operation of motor 39.

Upon either electrical or manual actuation of solenoid 81, plunger 88 is moved downwardly to strike end 110 of lever 103 and force it downwardly, causing upward movement of the right hand end of lever 103. This action lifts finger 109 out of slot 118 and closes contacts 73 of microswitch 75 through the actuation of spring member 101 which rides on the upper surface of lever 103. Upon actuation spring 101 raises plunger 99 carrying with it armature 96 of microswitch 75 to close contacts 73.

Upon closure of contacts 73 an energizing circuit for motor 39 is completed, which circuit extends from control circuit 67 over conductor 69, contacts 73, armature 96, conductor 76, and the windings of motor 39 and conductor 77 to control circuit 67. Completion of this circuit energizes motor 39 causing it to rotate. Upon rotation of motor 39, linkage 122 causes shaft 120 to rotate in a counterclockwise direction with consequent rotation of ratchet wheel 123 which is connected thereto.

At the instant that finger 109 of lever 103 was moved upwardly in response to the actuation of solenoid 81, it moved out of slot 118 and out of engagement with finger 128 of clutch dog 125. Upon release of finger 128, clutch dog 125 at its tooth engaging finger 126 is urged by spring 127 into engagement with the teeth of ratchet wheel 123. It will be recalled that ratchet wheel 123 rotates in a counterclockwise direction and, therefore, clutch dog 125 is pulled around in the same direction because of its engagement with ratchet wheel 123. Because clutch dog 125 is pivotally mounted on plate 115 of cam 112, the cam in turn rotates in a counterclockwise direction.

It is contemplated that the actuation of solenoid 81 is momentary and after a very short time solenoid 81 retracts its plunger 83 out of engagement with lever 103. However, after cam 112 has begun rotation, slot 118 has moved around a short distance. After release of lever 103, finger 109 is urged downwardly by spring 111; but now finger 109 rides on the outer surface of flange 116 of cam 112 since slot 118 is no longer in position to receive it. After the cam 112 completes its revolution, finger 109 of lever 103 re-enters slot 118 and by engaging projection 128 of clutch dog 125 causes clutch dog 125 to disengage from ratchet wheel 123. At the same time downward movement of finger 109 into slot 118 causes contacts 73 to open because of the biasing action of spring 101 against the upper surface of lever 103. Opening of contacts 73 interrupts the presently described energizing circuit for motor 39 and it stops further rotation.

It is thus seen that momentary actuation of solenoid 81 causes motor 39 to rotate shaft 120 one and only one complete revolution each time that solenoid 81 is actuated. Each time motor 39 goes through one revolution, the previously discussed printing action occurs to print a record of the weight on the scale.

A second control circuit utilized in the present invention will now be described with reference to FIGURE 3. In FIGURE 3 there is therein illustrated a microswitch 135 similar to the microswitch 75 of FIGURE 2. More specifically, microswitch 135 comprises contacts 137 and armature 139, a plunger 140 and a spring member 141 to which plunger 140 is affixed. Spring member 141 is connected to microswitch 135 at one end and is biased so that plunger 140 which moves armature 139 normally holds contacts 137 open. A cam follower 143 is connected to the free end of spring 141 such that upward displacement of cam follower 143 causes movement of plunger 140 to close contacts 137 by moving armature 139 upwardly. To operate cam follower 143 there is provided a shoe member 145 which is connected to shaft 120 by a linkage 147. Shoe 145 is of relatively short length and causes closure of contacts 137 only momentarily during the cyclic rotation of shaft 120. Shaft 120, as shown in FIGURE 2, is connected over linkage 122 to motor 39.

Thus in summary it may be seen that while microswitch 75 (FIG. 2) at its contacts 73 are closed during the entire cycle of rotation of motor 39, contacts 137 of microswitch 135 are closed only momentarily during a short part of this cycle.

Microswitch 135 is connected to control circuit 67 by means of conductors 149 and 150.

The details of control circuit 67 which controls operation of printer motor 39 and recordation of the weight of the scale platform may be best understood by reference to FIGURE 4. FIG. 4 illustrates the control circuit 67 arranged so that the printer mechanism will respond at any time a condition of scale balance is sensed.

Referring now specifically to FIGURE 4, the control circuit 67 includes the elements therein shown except those portions shown within the dashed areas. Those portions within the dashed areas are shown in greater detail in FIGURES 2 and 3.

A source of 60 cycle 110 volt power 152 is connected over a double-pole single-throw switch 154 to conductors 155 and 156. The winding 85 of solenoid 81 is connected to power source 152 over a circuit extending from source 152 over one pole of switch 154, conductor 155, a contact 158 of a single-pole single-throw switch 160, normally closed contacts 162a, normally closed contacts 164a, conductor 93, the winding 85 of solenoid 81, conductor 94, conductor 156 and the other pole of switch 154 to source 152. The winding of relay 164 which controls normally closed contacts 164a may be energized over a circuit extending from power source 152 over one pole of switch 154, conductor 155, contacts 158 of switch 160, normally closed contacts 162a, conductor 149, contacts 137 of microswitch 135, conductor 150, the winding of relay 164, conductor 156, and the other pole of switch 154 to source 152. An energizing circuit for relay winding 164 may be also completed over its own holding contacts 164b which are connected in parallel with contacts 137 of microswitch 135. The energizing circuit for motor 39 extends from power source 152 over one pole of switch 154, conductor 155, contact 158 of switch 160, normally closed contacts 162a, conductor 69, contacts 73 of microswitch 75, the winding of motor 39, conductor 77, conductor 156, and the other pole of switch 154 to power source 152. Pilot light 79 is connected across the winding of motor 39 to indicate its energization.

Having thus described the circuit and mechanical arrangement of one embodiment of the present invention, the operation thereof will now be considered.

Before proceeding however, attention is drawn to normally closed contacts 162a. These contacts are controlled by a balance sensing circuit, the details of which will be discussed hereinafter with reference to FIGURE 5. However, at this point it is sufficient to note that contacts 162a are open whenever there is a condition of unbalance sensed in the system, and they are closed whenever there is a condition of balance in the system.

It is assumed that a load is applied to the platform 10 and a condition of scale unbalance occurs. Assuming now that switch 160 has its armature moved so as to close contacts 158 and that switch 154 is closed, it will be apparent that motor 39 is not energized while contacts 162a are open during an unbalance of the system. The mechanical scale system responds to the application of the load to the platform and operates to rebalance the scale system. When this condition of balance is sensed contacts 162a close to complete the previously described energizing circuit for the winding 85 of solenoid 81. Upon energization, solenoid 81 closes contacts 73 of microswitch 75 in the manner discussed with reference to FIGURE 2, and completes the energizing circuit for motor 39.

Motor 39 rotates and causes forward movement of index finger 30 and fingers 35—37. Finger 30 engages index wheel 28 to lock the selector discs 31—33 in position. Fingers 35—37 engage their selector discs 31—33, and position thereby, printer members 45—47 so that a record of the weight on the scale is recorded.

During the cycle of rotation of motor 39, contacts 137 of microswitch 135 (FIG. 3) are closed by actuation of shoe 145 and cam follower 140. Closure of contacts 137 completes the energizing circuit for the winding of control relay 164. Upon energization, relay 164 closing its holding contacts 164b to complete its own previously described holding circuit. Simultaneously, relay 164 opens its normally closed contacts 164a to interrupt the energizing circuit for solenoid 81. Solenoid 81 retracts its plunger 83 and permits finger 109 of lever 103 to re-enter slot 118 when the latter is rotated around to a position to receive the finger. This occurs after one revolution of motor 39. Re-entry of finger 109 into slot 118 results in opening contacts 73 of microswitch 75 and the consequent de-energization of motor 39, after motor 39 has completed one complete revolution.

As long as this balance prevails, relay 164 at its contacts 164a continues to interrupt the energizing circuit for solenoid 81 and prevents a subsequent repeat printing of the weight.

When the weight is removed from the scale, contacts 162a open under the control of the balance sensing circuit (FIG. 5) which now senses an unbalance condition in the scale system. The opening of contacts 162a interrupts the energizing circuit for relay 164, which at its normally closed contacts 164a prepares the energizing circuit for solenoid 81. Relay 164 at its contacts 164b interrupts its own holding circuit and is de-energized.

The circuit has now been restored to its normal condition and is ready to print whenever the system again reaches balance. This latter condition may occur when the scale pointer reaches zero to indicate there is no load on the platform. Thus, in normal use, each alternate reading will be zero to inform the operator that the scale has restored to its zero condition properly.

The balance sensing circuit which is sensitive to the balance and unbalance of the scale is shown in greater detail in FIGURE 5, reference to which is now made. The relay contacts 162a (shown in FIG. 4) appear in the upper right hand portion of FIGURE 5. These contacts are opened and closed under the control of relay winding 162 as herein shown. The remainder of the circuit of FIGURE 5 transmits the light pulse information from photocell 61 into electrical pulses which control the energization and de-energization of relay winding 162.

The balance sensing circuit of FIGURE 5 comprises a transformer 180 having a primary winding 182 and two secondary windings 183 and 184. Primary winding 182 is connected directly to power source 152. Secondary winding 184 is connected over a bridge rectifier 186 and a resistor-condenser filter network 187 to light source 60 to provide power thereto. Tap 189 on secondary winding 184 is connected to the heater circuits 191 of the electron discharge devices used in the circuit of FIGURE 5.

The circuit of FIGURE 5 uses two duo-triodes 192 and 193. Suitable duo-triodes may be 12AU7 vacuum tubes or their equvalent. The first half of each duo-triode will be denoted with the small letter "a" following its respective number, while the second half will be denoted by the small letter "b" following its respective number. Rectifier circuit 195 and a filter circuit 196 is connected to the secondary winding 183 of transformer 180. The rectifier circuit 195 comprises two rectifiers 199 and 200. Rectifiers 199 and 200 are connected together and to one side of the secondary winding 183 over a resistor 202. The other end of rectifier 200 is connected to ground and to the other side of secondary winding 183 over a filter condenser 204. Filter network 196 comprises a resistor 206 connected to the other side of rectifier 199 and to filter condensers 208 and 209 connected in parallel from respective ends of resistor 206 to ground.

In order to simplify the further description of the electrical circuit of FIGURE 5, the junction of resistor 206 and condenser 209 is designated with the capital letter "B." The first half 192a of electron discharge device 192 comprises a plate 211, grid 212 and a cathode 213. Plate 211 is connected to point B over a plate resistor 214. Cathode 213 is connected to ground over an unbypassed cathode resistor 216. Grid 212 is connected to an input circuit 218. Circuit 218 comprises the series combination of a resistor 220 and the internal resistance of photocell 61, which series combination is connected between point B and ground. The junction of resistor 220 and photocell 61 is connected to grid 212 over the series combination of a D.-C. blocking condenser 222 and a grid resistor 223. A resistor 225 is connected between the junction of condenser 222 and resistor 223 and ground. Plate 211 of section 192a of tube 192 is connected to grid 227 of side 192b of tube 192, over a coupling condenser 230.

Grid 227 of tube 192b is connected to ground over the series combination of a resistor 231 and a potentiometer 233. The function of potentiometer 233 will be more fully discussed hereinafter. The plate 235 of side 192b of tube 192 is connected to point B over a plate resistor 237 and to the grid 239 of the first half 193a of electron discharge device 193 over the series combination of coupling condenser 240 and a grid resistor 241. The junction of condenser 240 and resistor 241 is connected to the junction of rectifier 200 and condenser 204 over the series combination of a resistor 243 and a resistor 245. The voltage at the junction of rectifier 200 and condenser 204 is maintained below ground. Cathode 246 of the second half 192b of electron discharge device 192 is connected directly to ground.

The first half 193a of duo-triode 193 which is connected in circuit as a cathode follower, comprises a plate 249, a grid 239 and a cathode 250. Plate 249 of electron discharge device 193a is connected directly to point B. The cathode 250 of discharge device 193a is connected to grid 252 of the second half 193b of electron discharge device 193b over a resistor 254. Cathode 250 is also connected to the plate 256 of electron discharge device 193b over a timing condenser 258 and to the junction of resistor 243 and resistor 245 over the series combination of a potentiometer 260, a resistor 262 and a resistor 264. Cathode 266 of the second half 193b of electron discharge device 193 is connected directly to ground and to the junction of resistors 262 and 264 over a resistor 268.

The operating winding of relay 162 is connected at one of its ends to the plate 256 of electron discharge device 193b and is connected at its other end to the junction of rectifier 199 and resistor 206 over a conductor 270.

The operation of the sensing circuit of FIGURE 5 may be best explained with reference thereto and to FIGURE 1. For this part of the explanation it will be initially assumed that disc 54 is rotating while the scale is in an unbalanced condition because of the application of load on platform 10. Rotation of disc 54 causes intermittent interruption of light beam 63 in its impingement on photocell 61. In the well known manner, the resistance of photocell 61 varies from a maximum to a minimum with the alternate interruption and application of light beam 63. With reference to FIGURE 5 it may be noted that photocell 61 comprises one section of the voltage divider comprising the series combination of resistor 220 and the internal resistance of photocell 61. The voltage signal at the junction of resistor 220 and photocell 61 changes in pulsating form from a maximum to a minimum value as a function of the resistance of photocell 61. These pulses are applied to the input circuit 218 of section 192a of electron discharge device 192. Sections 192a and 192b of electron discharge device 192 act merely as amplifiers in transmitting the voltage signal variations as pulses to the grid 239 of section 193a of electron discharge device 193. Section 193a of electron discharge device 193 acts as a cathode follower to drive the second section 193b of electron discharge device 193 from the previous amplifier stages.

It should be noted that in the absence of a positive pulse at the grid 239 of cathode follower stage 193a, this tube is cut off since its grid 239 is connected over resistors 241, 243, and 245 to a point of negative voltage at the junction of rectifier 200 and condenser 204. The circuit is designed so that the amount of negative voltage applied to grid 239 in the absence of a positive pulse is sufficient to accomplish this cut-off condition.

When a positive pulse originating because of the variation of the resistance of photocell 61 is applied to the grid 239 of cathode follower 193a, stage 193a conducts current and its output impedance becomes very low. Simultaneously, the positive pulse generates, through the cathode follower 193a, a positive pulse which is applied to the grid 252 of the control tube 193b, causing this tube to conduct. Plate current flows through stage 193b and through control relay winding 162 causing contacts 162a to open. Contacts 162a control the operation of an auxiliary circuit which is herein shown as the control circuit for printer motor 39. It will be recalled that the opening of contacts 162a interrupts the energizing circuit for printer motor 39 (FIG. 4) and prevents printing a record of the weight of the load applied to platform 10. Thus upon application of a pulse from the sensing circuit indicating unbalance of the scale system, the printer is prevented from operation.

When both stages 193a and 193b conduct, a discharge path for condenser 258 is completed. This path extends from ground over rectifier 195, filter 196, over the plate-cathode path of stage 193a, condenser 258, and the plate-cathode path of stage 193b to ground. Therefore, while disc 54 is rotating, positive pulses applied to cathode follower stage 193a maintain condenser 258 discharged. Between pulses there is a slight charge accumulated on condenser 258 but it quickly dissipates during the next positive pulse. It should be noted that the discharge path for condenser 258 includes the very low output impedance of stage 193a and the low plate-cathode impedance of stage 193b.

The discharge time of condenser 258 when positive pulses first appear in the system is very small and the system is therefore very sensitive to the initiation of rotation of disc 54.

On the other hand, when the disc 54 stops rotation indicating a condition of balance in the system, the de-energization of relay winding 162 is delayed. The duration of this delay is settable within a wide range and prevents printing the record of the weight of the applied load upon a momentary status of balance. The variable settable time delay feature is provided by potentiometer 260 in the charge path for condenser 258.

Upon the cessation of positive pulses to the grid 239 of cathode follower stage 193a, this stage is biased below cut-off in the manner previously discussed and no pulses are applied to grid 252 of stage 193b. However, a charging current flows into condenser 258 over a path from rectifier 195 over conductor 270, the winding of control relay 162, condenser 258, potentiometer 260, and resistors 262 and 268 to ground. Although the junction of resistors 264 and 262 is negative with respect to ground, the flow of charging current to condenser 258 maintains the grid 252 of stage 193b positive with respect to the cathode 266 and stage 193b continues to conduct. Therefore, relay winding 162 is still energized, preventing the printing operation. However, as condenser 258 continues to charge, the rate of flow of charging current diminishes in an exponential fashion and the voltage at grid 252 approaches a negative value in corresponding manner. At a point in the charging cycle, determined by the RC time constant of the charging path, the voltage at grid 252 of stage 193b reaches a cut-off point and this stage ceases conduction. Condenser 258 continues to charge, however, through the winding of relay 162. When the flow of current through the winding of relay 162 falls below its operating value, a relay 162 is de-energized and closure of contacts 162a follow. At this time the energizing path for solenoid 81 is completed and the printer operates.

The time constant of the charge cycle of condenser 258 depends in part on the settable value of the resistance of potentiometer 260 and the plate-cathode impedance of stage 193b during conduction. It is evident that adjustment of the value of the resistance of potentiometer 260 determines the delay in response of the printer motor to sensing of balance of the scale. If the resistance of potentiometer 26 is increased, a longer time delay is introduced. In this manner the speed of response of the printer after determination of balance can be adjustably set.

Another feature of the present invention resides in its sensitivity adjustment. The circuit of FIGURE 5, may be adjusted to respond to different pulse speeds, or different speeds of rotation of disc 54. This is accomplished by adjustment of potentiometer 233.

The setting of the potentiometer 233 determines the amplitude of the voltage pulses applied to the input of cathode follower stage 193a. If the amplitude of each applied voltage pulse is below a certain value, then the conduction of stage 193a is such that condenser 258 does not fully discharge after each pulse. This results in a build up of charge on the condenser so that relay 162 is de-energized after a certain time delay. However, if the number of pulses per second increases, for the same applied amplitude, then condenser 258 will be maintained in its discharge state and relay 162 will remain energized. It may thus be seen that there is an interrelation between the setting of potentiometer 233 which establishes the amplitude of the voltage pulses applied to cathode follower 193a and the speed of rotation of disc 54 which determines the number of pulses per second. Therefore, for a given setting of time delay potentiometer 260, the setting of potentiometer 233 may be varied to establish the sensitivity of the instrument in terms of rotational speed of disc 54.

Thus, assume that potentiometer 233 is set so that if disc 54 rotates to produce 14 pulses per second, then the charge cycle of condenser 258 is initiated. As the indicator in its travel because of a load on the platform slows down as balance is approached, the disc 54 also slows down until it generates 14 pulses per second. The time delay feature now begins to function and relay 162 is de-energized after a time delay determined by the setting of potentiometer 260.

If it is desired to increase the sensitivity of the scale so that relay 162 responds to a lower speed of rotation of disc 54, then potentiometer 233 is adjusted to introduce more resistance and increase the gain of stage 192b so that pulses of greater amplitude are applied to the input of cathode follower 193a. Conversely, if it is desired to lower the sensitivity of the scale so that relay 162 responds to a higher indicator speed, potentiometer 233 is adjusted to reduce the gain.

External factors such as vibration or wind loads may make lower sensitivities more desirable. Under these circumstances the time delay may be increased.

There has thus been described a novel sensing circuit which responds to rotation or cessation of rotation of a shaft and has a settable time delay following sensing of cessation of a shaft rotation. The time delay factor as well as the sensitivity of the scale to speed of rotation of the shaft may each be independently adjusted for optimum results.

While the invention has been fully described and illustrated, other rearrangements, modifications and changes will occur to those skilled in the art without exceeding the scope of the appended claims.

We claim:

1. A condition sensing circuit comprising a condition sensitive element whose resistance varies as a function of the condition; an amplifier, an input circuit for said amplifier including said variable resistance of said element for generating electrical pulses corresponding to said resistance variations; a cathode follower connected to said amplifier for conduction upon receipt of pulses from said amplifier; a condenser having a discharge circuit through said cathode follower upon its conduction; a control electron discharge device connected to said condenser and to said cathode follower such that said control device conducts during conduction of said cathode follower; a relay winding connected to said control device for energization during conduction of said device and de-energization during non-conduction of said device; a circuit connected to said condenser and said control device for providing an alternate charge path upon non-conduction of said cathode follower and for causing cessation of conduction of said control device during a steady state of said condition, and means operatively connected to said relay winding for completing an auxiliary circuit upon de-energization of said relay winding.

2. A condition sensing circuit comprising a condition sensitive element whose resistance varies as a function of the condition; an amplifier, an input circuit for said amplifier including said variable resistance of said element for generating electrical pulses corresponding to said resistance variations; a cathode follower connected to said amplifier for conduction upon receipt of pulses from said amplifier; a condenser having a discharge circuit through said cathode follower upon its conduction; a control electron discharge device connected to said condenser and to said cathode follower such that said control device conducts during conduction of said cathode follower; a relay winding connected to said control device for energization during conduction of said device and de-energization during non-conduction of said device; a circuit connected to said condenser and said control device for providing an alternate charge path upon non-conduction of said cathode follower and for causing cessation of conduction of said control device during a steady state of said condition, said circuit including a settably adjustable potentiometer and means operatively connected to said relay winding for completing an auxiliary circuit upon de-energization of said relay winding.

3. A condition sensing circuit for detecting rotation of a shaft comprising: a rotatable shaft, a light source for emitting a beam of light, a light sensitive device in registration with said beam of light, the resistance of said device being variable as a function of the intensity of light impinging thereon; a movable member interposed in said light beam, said movable member being connected to the shaft whose rotation is to be sensed to cause intermittent interruption of said light beam whenever said shaft rotates; an amplifier, an input circuit for said amplifier including said variable resistance of said element for generating electrical pulses corresponding to said resistance variation; a condenser, a discharge circuit coupled to said condenser and to said amplifier, said discharge circuit being completed in response to receipt of said pulses, a charge circuit coupled to said condenser, said charge circuit including an adjustable resistance for adjusting the time of charge of said condenser, said charge circuit being established upon cessation of pulses from said amplifier, a controlled circuit connected to said condenser for energization during said discharge time of said condenser and for de-energization during at least a portion of said adjustable charge time of said condenser, and an auxiliary circuit connected to said controlled circuit for operation thereby.

4. A condition sensing circuit for detecting rotation of a shaft comprising: a rotatable shaft, a light source for emitting a beam of light, a light sensitive device in registration with said beam of light, the resistance of said device being variable as a function of the intensity of light impinging thereon; a movable member interposed in said light beam, said movable member being connected to the shaft whose rotation is to be sensed to cause intermittent interruption of said light beam whenever said shaft rotates; an amplifier, an input circuit for said amplifier including said variable resistance of said device for generating electrical pulses corresponding to said interruptions of said light beam; a cathode follower connected to said amplifier for conduction upon receipt of pulses from said amplifier; a condenser, a discharge circuit connecting said condenser through said cathode follower upon conduction of said cathode follower; a control electron discharge device connected to said condenser and to said cathode follower such that said control device conducts during conduction of said cathode follower; a relay winding connected to said control device for energization during conduction of said device and de-energization during non-conduction of said device, a circuit connected to said condenser and said control device for providing an alternate charge path upon non-conduction of said cathode follower and for causing cessation of conduction of said control device during non-movement of said movable member, and means operatively connected to said relay winding for completing an auxiliary circuit upon de-energization of said relay winding.

5. A condition sensing circuit for detecting rotation of a shaft comprising: a rotatable shaft, a light source for emitting a beam of light, a light sensitive device in registration with said beam of light, the resistance of said device being variable as a function of the intensity of light impinging thereon; a movable member interposed in said light beam, said movable member being connected to the shaft whose rotation is to be sensed to cause intermittent interruption of said light beam whenever said shaft rotates; an amplifier, an input circuit for said amplifier including said variable resistance of said device for generating electrical pulses corresponding to said interruptions of said light beam; a cathode follower connected to said amplifier for conduction upon receipt of pulses from said amplifier; a condenser having a discharge circuit through said cathode follower upon its conduction; a control electron discharge device connected to said condenser and to said cathode follower such that said control device conducts during conduction of said cathode follower; a relay winding connected to said control device for energization during conduction of said device and de-energization during non-conduction of said device, a circuit connected to said condenser and said control device for providing an alternate charge path upon non-conduction of said cathode follower and for causing cessation of conduction of said control device during non-movement of said movable member, said last mentioned circuit including an adjustable resistance for adjusting the charge time of said condenser, and means operatively connected to said relay winding for completing an auxiliary circuit upon de-energization of said relay winding.

6. A condition sensing circuit for detecting rotation of a shaft, comprising: a rotatable shaft, a light source for emitting a beam of light, a light sensitive device in registration with said beam of light, the resistance of said device being variable as a function of the intensity of the light impinging thereon, a disc having a notched periphery connected to the shaft whose rotation is to be sensed and having the notched periphery of said disc interposed in said beam of light for causing intermittent interruption of said light beam whenever said shaft rotates; an amplifier, an input circuit for said amplifier including said variable resistance of said device for generating electrical pulses corresponding to said interruptions of said light beam; a cathode follower connected to said amplifier for conduction upon receipt of pulses from said amplifier; a condenser having a discharge circuit through said cathode follower upon its conduction; a control electron discharge device connected to said condenser and to said cathode follower such that said control device conducts during conduction of said cathode follower; a relay winding connected to said control device for energization during conduction of said device and de-energization during non-conduction of said device, a circuit connected to said condenser and said control device for providing an alternate charge path upon non-conduction of said cathode follower and for causing cessation of conduction of said control device during non-movement of said movable member, and means operatively connected to said relay winding for completing an auxiliary circuit upon de-energization of said relay winding.

References Cited in the file of this patent
UNITED STATES PATENTS

| 2,547,332 | Loveless et al. | Apr. 3, 1951 |
| 2,596,591 | Packard et al. | May 13, 1952 |
| 2,809,297 | Hartwig et al. | Oct. 8, 1957 |